March 21, 1961 J. K. WELCHON 2,975,724
INTERMITTENT GAS-LIFT SYSTEM
Filed Nov. 21, 1957 2 Sheets-Sheet 1

INVENTOR.
J.K. WELCHON
BY Hudson & Young
ATTORNEYS

# United States Patent Office 2,975,724
Patented Mar. 21, 1961

2,975,724
INTERMITTENT GAS-LIFT SYSTEM

James K. Welchon, Bartlesville, Okla., assignor to Phillips Petroleum Company, a corporation of Delaware Filed Nov. 21, 1957, Ser. No. 697,883

8 Claims. (Cl. 103—232)

This invention relates to an intermittent gas-lift system for producing oil from an oil well. In one aspect it relates to a system for producing oil from a low production well by an intermittent gas-lift system. In another aspect it relates to a system for producing oil from low production wells by a gas-lift system wherein fluids produced at the well head under high gas-lift pressure are diverted to a high pressure separator tank and fluid at the well head having a low pressure is diverted to a low pressure separator tank.

In the production of oil from oil wells by gas-lift systems, gas separated from the oil is usually recompressed and recycled for further production of oil from the well. Compression of this gas from a low pressure to a relatively high pressure, as is well known in the art, is an expensive operation. It is one of the purposes of my invention to provide a gas-lift system wherein high pressure gas produced at the well head is separated from the low pressure gas produced at the well head with the result that a separated high pressure gas needs less compression than the separated low pressure gas prior to recycling.

An object of my invention is to provide an intermittent gas-lift oil production system which is less expensive to operate than conventional systems in that less compression of the gas recycled is required.

Another object of my invention is to provide an intermittent gas-lift system sufficiently inexpensive to operate that the system can be used in the production of oil from wells producing small volumes of oil.

Another object of my invention is to provide such a system which is automatic in operation and requires a minimum of man power for operation and maintenance.

Yet another object of my invention is to provide such a gas-lift system for use in wells producing little or substantially no gas with the oil.

Still other objects and advantages of my invention will be realized by those skilled in the art upon reading the following description, which taken with the attached drawing, forms a part of this specification.

Specifically my invention involves in an intermitting cycle gas-lift system for producing oil from an oil well, the improvement comprising, in combination, a first separator vessel, a first conduit communicating said first separator vessel with said oil well, a second separator vessel, a second conduit communicating said second separator vessel with said oil well, a high pressure compressor, a third conduit communicating the space of said first separator vessel normally occupied by gas with the inlet to said high pressure compressor, a low pressure compressor, a fourth conduit communicating the space of said second separator vessel normally occupied by gas with the inlet of said low pressure compressor, a fifth conduit communicating the outlet of said low pressure compressor with the inlet of said high pressure compressor, a sixth conduit communicating the outlet of said high pressure compressor with a gas inlet to said gas-lift well, a fluid flow control device in said first and second conduits, said fluid flow control device being adapted to direct flow of high pressure fluid from said oil well through said first conduit into said first separator vessel and alternately to direct flow of low pressure fluid through said second conduit into said second separator vessel, and separate means for outlet of liquid from said first and second separator vessels.

A sub-combination of apparatus of my invention is an apparatus for separating low pressure fluid from high pressure gas comprising, in combination, a valve body having a first conduit therethrough, a side outlet in said valve body communicating with said conduit, a first valve seat around the inner wall of said side outlet, a second valve seat surrounding a portion of said first conduit, a two-way valve head intermediate said first and second valve seats, said valve head being adapted upon upward movement to seat against said second valve seat with said first valve seat being open, and upon downward movement to seat against said first valve seat with said second valve seat being open, a second conduit in communication with said first conduit on the valve head side of said second valve seat, a motor for actuating said valve head, an orifice plate in said second conduit, upstream of said side outlet as regards direction of flow of fluid through said conduits, first means for actuating said valve head in response to a differential fluid pressure across said orifice plate, and second means for actuating said valve head in opposition to said first means and in response to fluid pressure in said second conduit.

Figure 1:
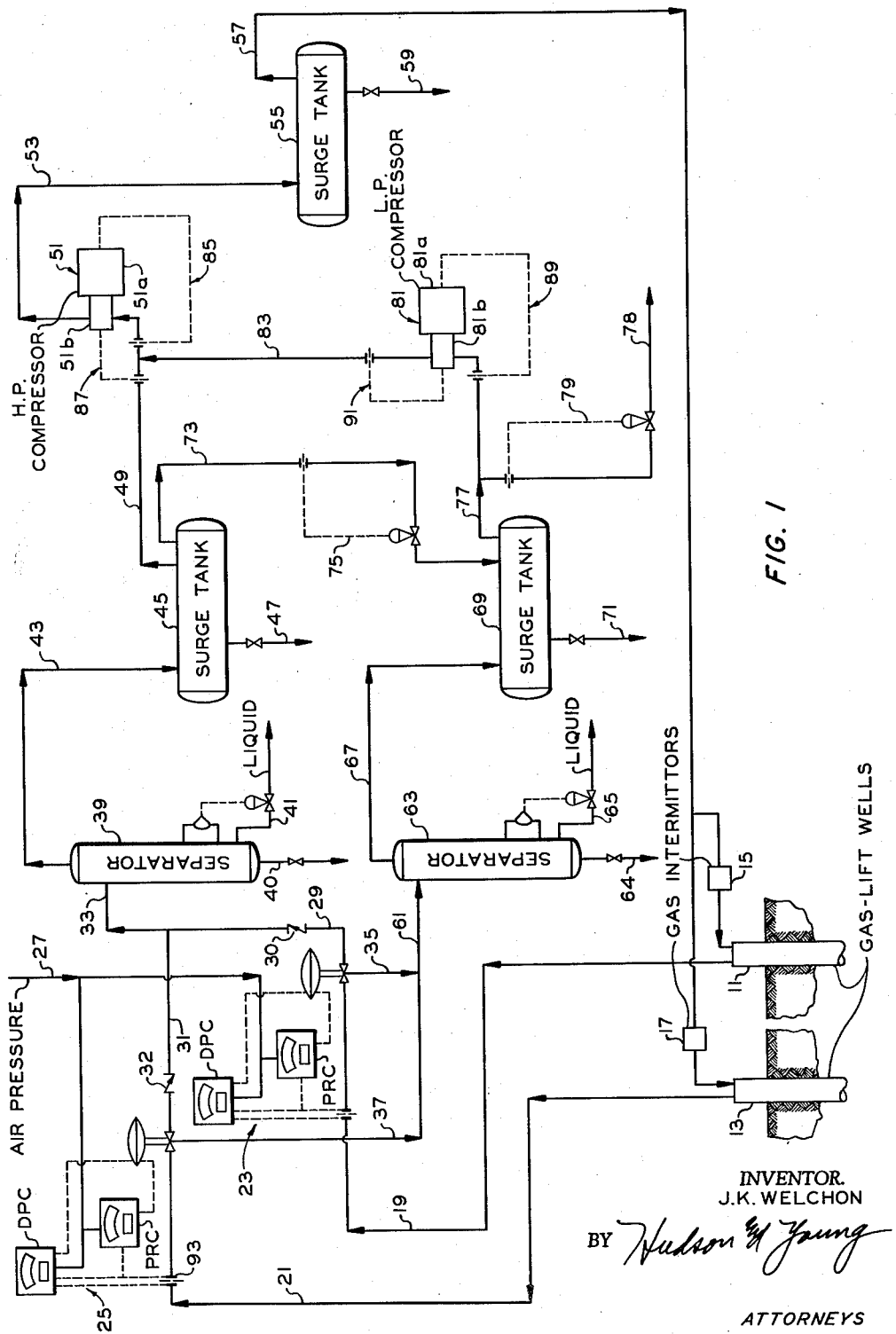
Figure 1 illustrates diagrammatically, one form of apparatus for carrying out the process of my invention.

Referring now to the drawings and specifically to Figure 1 reference numerals 11 and 13 identify oil wells which are produced by gas-lift equipment. Reference numerals 15 and 17 are gas intermitters which operate on time or other cycles to admit pressure gas to the wells for lifting the oil. Pipes 19 and 21 conduct the mixture of oil and lifting gas from the wells to the particular apparatus of my invention. Reference numerals 23 and 25 identify assemblies of control apparatus which are adapted to separate high and variable high pressure fluid from low pressure fluid and to direct the separated high pressure fluid to a high and variable high pressure separator tank and to direct the low pressure fluid to a low pressure separator tank. I will describe this control apparatus as being pneumatically operated apparatus but it is to be realized that electrically operated apparatus, or a combination of the two types of apparatus is, in some instances, used. When employing pneumatically operated apparatus as herein set forth, pneumatic pressure from a source, not shown, enters the system of Figure 1 through a pipe 27. High pressure fluid from control apparatus 25 flows through pipes 31 and 33 into a high pressure or variable high pressure separator tank 39. A pipe 29 conducts high or variable high pressure fluid from control apparatus 23 into pipe 33 from which it passes into separator 39. Check valves 30 and 32 are provided as shown to prevent back flow of high pressure fluid. A valved pipe 41 is provided for outlet of separated liquid from separator 39 while a valved pipe 40 is provided for outlet of water in case water is separated from the fluid in this separator. Pipes 35 and 37 conduct low pressure fluid from the controls 23 and 25, respectively, to pipe 61 from which it passes into a low pressure separator tank 63. This tank also is provided with a valved outlet pipe 65 for outlet of production oil and also with a water draw valved pipe 64.

Gas from the variable high pressure separator 39 passes through a pipe 43 into surge tank 45 from which it passes on through a pipe 49 to the inlet of a high pressure compressor 51. Since the gas from the surge tank 45 is at a higher pressure than the gas in surge tank 69 from separator 63 it is obvious that the gas from tank 45 needs less compression than does the gas from the low pressure tank. Thus, compressor 51 is considered a high stage compressor or in case the compressor of this system is a two-stage compressor, it is then the high stage of the compressor. 51a identifies the engine driving the compressor 51b. Compressed gas leaves compressor 51b through a pipe 53 and passes into a surge tank 55 from which it is withdrawn through a pipe 57 for passage to the intermitters 15 and 17 for reuse as lifting gas in wells 11 and 13.

The low pressure gas separated from liquid in separator 63 is removed therefrom by the way of a pipe 67 and is passed into surge tank 69 from which it is withdrawn through a pipe 77 and passed to a low stage or low pressure compressor 81. This low stage compressor is intended to compress the gas to about the same pressure as the gas which is separated in the high pressure separator 39.

Compressed gas from the low pressure compressor 81 leaves by way of a pipe 83 and is added to the separated high pressure gas in pipe 49. This combined gas then enters compressor 51b for final compression to recycle pressure. Compressor 81 comprises an engine 81a which drives the actual compressor 81b. Surge tank 55 is provided with a valved pipe 59 for removal of liquid in case any liquid separates in this tank. Surge tanks 45 and 69 are provided with valved pipes 47 and 71, respectively, for withdrawal of liquids.

A pipe 73 connects the high pressure surge tank 45 with the low pressure surge tank 69 as illustrated. This pipe is provided with a back pressure regulator 75 set to maintain a predetermined minimum pressure in the surge tank 45. Thus any pressure in surge tank 45 greater than the predetermined value is passed through regulator 75 into the surge tank 69. Thus this back pressure regulator 75 prevents gas at too high a pressure from entering compressor 51b and thus overloading engine 51a. It is common in the gas compression art to employ engines for operating compressors at rated capacity rather than to provide oversize engines. A pipe 78 is provided with a back pressure regulator 79 for relief of pressure in case the pressure becomes higher than desired in the low pressure surge tank portion of the system.

Reference numeral 87 identifies a variable capacity apparatus on the high stage compressor cylinder which apparatus is automatically controlled by pressure in the variable pressure separator portion of the system. This variable capacity apparatus operates to provide substantially a constant power load on the high stage compressing cylinder or cylinders. Such a variable capacity apparatus is fully described in a copending application Serial No. 697,882, filed November 21, 1957.

Reference numeral 85 identifies an over-running speed control apparatus on the engine driving compressor 50b in order to maintain the inlet pressure to the compressor at or above a predetermined minimum value. By using this over-running speed control apparatus on engine 51a it is obvious that the pressure of a gas in pipe 49 admitted to compressor 51b is always maintained at a relatively high value. In other words, if the pressure decreases in pipe 49, apparatus 85 slows down the engine 51a, and if the pressure increases in pipe 49, the engine speeds up.

Reference numeral 91 identifies a variable capacity apparatus employed on the low stage compressor cylinder or cylinders. The variable capacity is automatically controlled by pressure of the variable high pressure separation portion of the system by connecting to pipe 83. This variable capacity operates to load properly the low stage cylinder or cylinders as their discharge pressure fluctuates.

Reference numeral 89 identifies an automatic speed and pressure control apparatus employed on the low stage compressor cylinder or cylinders which regulates the compressor speed to maintain a constant pressure on the low pressure separator portion of the system.

The variable capacity apparatus 91 is exactly like variable capacity apparatus 87. Variable capacity apparatus 91 operates in response to pressure in pipe 83, that is, on the discharge side of compressor cylinder 81 while the variable clearance apparatus 87 operates in response to pressure in pipe 49.

Figure 2:
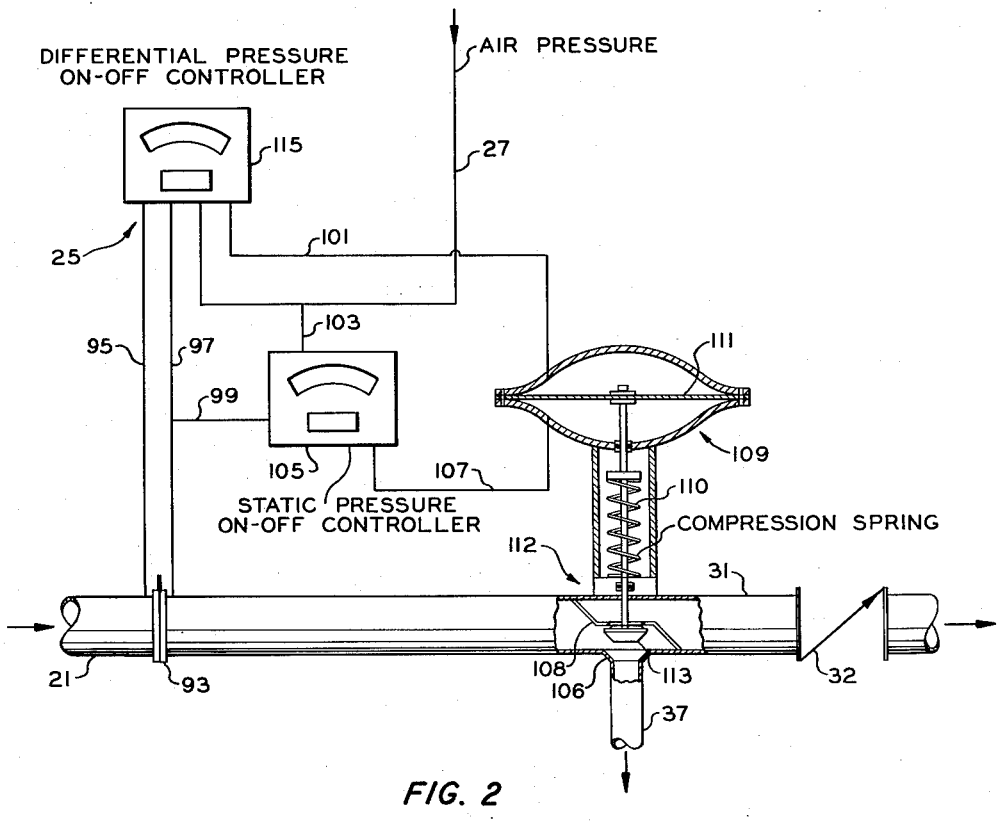
Figure 2 illustrates diagrammatically and on an enlarged scale, a portion of the apparatus of Figure 1.

Figure 2 illustrates on an enlarged scale the control apparatus 23 and 25 of Figure 1. Control apparatus 23 is exactly like control apparatus 25. This control apparatus, as apparatus 25, is installed in pipe 21 as illustrated in Figure 1. The control apparatus comprises an off-center or eccentric orifice plate 93 installed in pipe 21 as illustrated. Tube 95 and tube 97 take off from the upstream side and from the downstream side of orifice plate 93, respectively, and lead to a differential on-off controller 115. Reference numeral 105 identifies an on-off pressure controller which operates in response to a static pressure on the downstream side of orifice plate 93. This controller communicates with tube 97 by way of the tube 99. Air or pressure fluid from a source, not shown, is led to this system through pipe 27 from which a tube 103 conducts pressure air to the on-off controller 105. Tube 27 conducts pressure air also to the differential controller 115. A tube 101 conducts air under pressure from the differential controller in response to a pressure differential across orifice plate 93. This differential controller is so set that when the pressure differential across orifice plate 93 is less than a predetermined value air is admitted through the tube 101 to the upper side of a diaphragm 111 in the diaphragm motor 109. The static pressure on-off controller 105 is so adjusted that air is admitted through pipe 107 to the underside of diaphragm 111 when the pressure on the downstream side of orifice plate 93 is below a predetermined value.

Downstream from orifice plate 93 is a motor valve 112 which is operated by a diaphragm motor 109. This motor valve comprises a valve head 113 a lower valve seat 106 and an upper valve seat 108. Valve head 113 when lifted upward is intended to seat against seat 108 with seat 106 being open and when lowered is intended to seat against the lower seat 106 with upper seat 108 being open. A spring 110 is a compression spring of such strength that when the air pressure above diaphragm 111 exactly balances the air pressure below the diaphragm the spring raises the diaphragm and opens valve 113 from seat 106 and seats against valve seat 108.

This control apparatus of Figure 2 is intended to operate in the following manner. When low pressure gas is flowing through pipe 21 and through orifice plate 93 the pressure differential across orifice plate 93 is below a predetermined pressure differential and the differential controller 115 admits pressure air through tube 101 to the upper side of diaphragm 111. At the same time a low pressure is registered in the on-off pressure controller 105 by way of the tubes 97 and 99 and air pressure is admitted through tube 107 to the underside of diaphragm 111 to at least balance the pressure on the upper side of this diaphragm. In this manner compression spring 110 raises valve 113 to seat against upper seat 108 with lower seat 106 being opened. In this manner the low pressure gas flow from pipe 21 passes through pipe 37 to the low pressure separator 63.

The flow of low pressure gas from well 13 through pipe 21 precedes the flow of liquid. When liquid starts to flow through pipe 21 the differential pressure across orifice plate 93 increases to a value above the aforementioned predetermined value and the controller 115 operates to close off the pressure air from tube 101 thus relieving pressure from the upper side of diaphragm 111. When liquid is flowing through orifice plate 93 the pressure of the liquid at this point is still relatively low and the pressure transmitted through tubes 97 and 99 to controller 105 is still below the predetermined pressure and pressure controller 105 remains as previously set to admit pressure air through tube 107 to the underside of diaphragm 111 thereby maintaining valve 113 open from seat 106 and closed against seat 108 thereby allowing liquid to flow through pipe 37 into the low pressure separator 63.

As liquid continues flowing through orifice plate 93 the pressure differential increases to a value above the predetermined differential pressure and a higher pressure is transmitted through tubes 97 and 99 to controller 105 and this controller closes off the air supply to tube 107 and with the air supply previously closed off from above diaphragm 111 spring 110 maintains valve 113 in a closed position against seat 108 and open from seat 106 thereby continuing to allow passage of liquid to the low pressure separator tank 63. Near the end of the flow of liquid the pressure of the liquid increases markedly because the liquid is followed immediately by high pressure gas. At about the end of the flow of liquid when gas begins to flow through orifice plate 93 the pressure differential across the plate decreases and this relatively low pressure differential is transmitted through tubes 95 and 97 to controller 115 which in turn increases the pressure air in tube 101 to the upper side of diaphragm 111 while the high pressure in tube 97 is transmitted to tube 99 to the controller 105 which remains as just previously stated, that is, pressure air is not admitted to pipe 107 and the pressure air on top of diaphragm 111 pushes the diaphragm downward and the valve 113 is seated against seat 106 and is opened from seat 108. In this manner the high pressure gas is flowed through pipe 31 to the high or variable high pressure separator 39. As high pressure gas flows the same conditions are maintained and all of the high pressure gas flows to the variable high pressure separator 39. Depending upon the interval on which the intermittors 15 and 17 operate, at the end of the high pressure gas flow and approach of liquid flow a quantity of low pressure gas follows the high pressure gas and precedes the liquid and this low pressure gas on passing orifice plate 93 registers a low pressure differential across the plate which causes differential controller 115 to admit pressure air through tube 101 to the upper side of diaphragm 111 and also admits low pressure through tubes 97 and 99 to controller 105 which also admits air through 107 to the underside of diaphragm 111. With the pressures above and below the diaphragm 111 balanced the compression spring 110 raises valve 113 to seat against seat 108 and to open seat 106 so that the low pressure gas flows through pipe 37 into low pressure separator 63. At this stage in the process this control apparatus is ready for the start of a second slug of liquid.

One method of unloading a compressor to maintain a constant load on an engine driving the gas compressor is to hold open a special intake valve or one intake valve of a plurality of intake valves of the compressor during a portion of the compression stroke. In this manner the cylinder is partially unloaded thereby preventing overloading of the engine in case inlet gas pressure to the compressor has increased to a pressure above the pressure which loads the compressor cylinder to the capacity of the engine. A device for accomplishing this result is fully disclosed and claimed in my copending application Serial No. 697,882, filed November 21, 1957.

Figure 3:
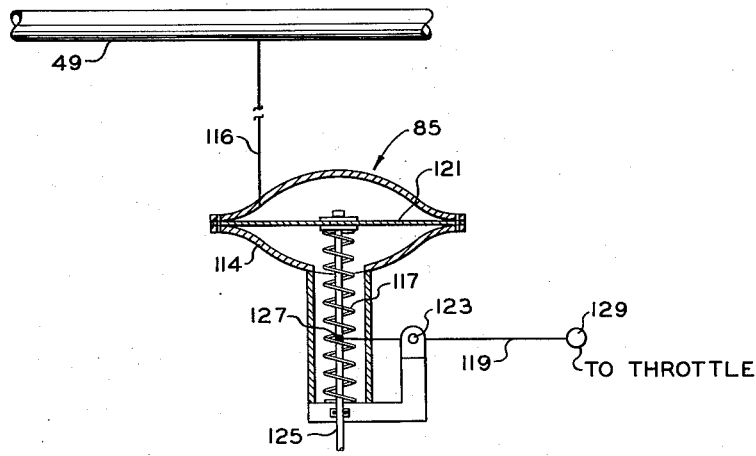
Figure 3 illustrates diagrammatically one form of automatic engine speed control for the high pressure compressor engine of Figure 1.

The automatic engine speed controls 85 and 89 as herein described are relatively simple. In Figure 3 is illustrated one suitable form of an automatic engine speed control which I will describe as applied to compressor 51 of Figure 1. The control regulates the engine speed in response to pressure in pipe 49. Tube 116 takes off from pipe 49 and leads to the upper side of a diaphragm 121 of a diaphragm motor 85. A compression spring 117 surrounds a rod 125 as shown and biases the diaphragm and rod in an upward position. Housing 114 is of course gas-tight on the upper side of the diaphragm and serves merely as a protector to the lower side of the diaphragm. An arm 119 is pivoted at 123 as a fulcrum. The left hand end of arm 119 is pivoted at 127 to rod 125 so that as the pivot 127 moves upward the right hand end 129 of the arm moves downward, and vice versa. In the operation of the device of Figure 3, it is intended that as the pressure in pipe 49 increases above a predetermined value this increase of pressure is transmitted through tube 116 to the upper side of diaphragm 121 thereby pushing the diaphragm downward. The downward movement of the diaphragm and rod 125 moves the pivoted end 129 of arm 119 upward. This end 129 of the arm is attached to the engine throttle and an upward movement of this end of the arm opens the throttle to increase the speed of the engine, thereby relieving the high pressure in pipe 49. Conversely when pressure in pipe 49 decreases to a value below the predetermined value compression spring 117 raises the pivot 127 upward and the throttle end 129 of the arm moves downward to throttle the engine and slow its speed.

As an example of the operation of my invention back pressure valve 79 is set to vent pressure pipe 77 at pressures from about 25 to 50 p.s.i.g. (lbs. per sq. in. gage), for example 35 p.s.i.g. The back pressure regulator 75 is set to relieve pressure from surge tank 45 at a maximum pressure of about 300 p.s.i.g. The pressure maintained in the variable high pressure portion of system is not constant but is dependent upon the operation of controls 23 and 25. It is immaterial whether the pressure in the variable high pressure portion be maintained constant as long as it is higher or in fact considerably higher than the pressure maintained in the low pressure portion of the system. It is desirable however to maintain the pressure in the low pressure portion of this system reasonably constant so as to load the low pressure compressor at approximately a constant rate. In this manner the compressed gas discharged from compressor 81b through pipe 83 is at a relatively constant pressure and at a relatively constant rate. However, as this pipe 83 connects with pipe 49, the pressure in pipe 83 will obviously vary as pressure in pipe 49 varies.

One of the main advantages of my invention is that the high pressure gas is separated in the variable high pressure portion of a system and obviously this high pressure gas does not need as much compression to compress it to the pressure required for operation of the intermitters and the gas-lift apparatus of wells 11 and 13, as does the low pressure gas from tank 69. For example, it is less expensive to compress a portion of the gas from for example 300 p.s.i.g. to 1000 p.s.i.g. than it is to compress all the gas from 25 p.s.i.g. to 1000 p.s.i.g.

Liquids separated in separators 39 and 63 are the crude oil produced from wells 11 and 13 and these liquids are removed through pipes 41 and 65, respectively, for such disposal as desired.

While certain embodiments of the invention have been described for illustrative purposes, the invention obviously is not limited thereto.

I claim:

1. In an intermitting cycle gas-lift system for producing oil from an oil well having an oil outlet and a gas inlet, the improvement comprising, in combination, a first separator vessel having an upper normally gas containing space, a first conduit communicating said first separator vessel with the oil outlet of said oil well, a second separator vessel having an upper normally gas containing space, a second conduit communicating said second separator vessel with the oil outlet of said oil well, a high pressure compressor having an inlet and an outlet, a third conduit communicating said space of said first separator vessel with the inlet to said high pressure compressor, a low pressure compressor having an inlet and an outlet, a fourth conduit communicating said space of said second separator vessel with the inlet of said low pressure compressor, a fifth conduit communicating the outlet of said low pressure compressor with the inlet of said high pressure compressor, a sixth conduit communicating the outlet of said high pressure compressor with the gas inlet to said oil well, a fluid flow control device in said first and second conduits, said fluid flow control device including a 3-way motor valve in said first and second conduits, a seventh conduit communicating the motor of said motor valve with said oil outlet whereby said valve directs flow of oil and gas from said well to said first separator and to said second separator in response to pressure in said oil outlet gas intermitting means in said sixth conduit, and separate means for outlet of liquids from said first and second separator vessels.

2. In an intermitting cycle gas-lift system for producing oil from an oil well having an oil outlet and a gas inlet, the improvement comprising, in combination, a first separator vessel having an upper normally gas containing space, a first conduit communicating said first separator vessel with the oil outlet of said oil well, a second separator vessel having an upper normally gas containing space, a second conduit communicating said second separator vessel with the oil outlet of said oil well, a high pressure compressor having an inlet and an outlet, a third conduit communicating said space of said first separator vessel with the inlet to said high pressure compressor, a low pressure compressor having an inlet and an outlet, a fourth conduit communicating said space of said second separator vessel with the inlet of said low pressure compressor, a fifth conduit communicating the outlet of said low pressure compressor with the inlet of said high pressure compressor, a sixth conduit communicating the outlet of said high pressure compressor with the gas inlet to said oil well, a gas intermittor in said sixth conduit, a fluid flow control device in said first and second conduits, said fluid flow control device including a 3-way motor valve in said first and second conduits, a seventh conduit communicating the motor of said motor valve with said oil outlet whereby said valve directs flow of oil and gas from said well to said first separator and to said second separator in response to pressure in said oil outlet, an eighth conduit communicating said third conduit with said fourth conduit, a back pressure regulator motor valve in said eighth conduit, a ninth conduit communicating the motor of said back pressure regulator motor valve with a conduit selected from the group consisting of said third conduit and said eighth conduit intermediate said back pressure regulator motor valve and said third conduit, and separate means for outlet of liquids from said first and second separator vessels.

3. In an intermitting cycle gas-lift system for producing oil from an oil well having an oil outlet and a gas inlet, the improvement comprising, in combination, a first separator vessel having an upper normally gas containing space, a first conduit communicating said first separator vessel with the oil outlet of said oil well, a second separator vessel having an upper normally gas containing space, a second conduit communicating said second separator vessel with the oil outlet of said oil well, a high pressure compressor, having an inlet and an outlet, a third conduit communicating said space of said first separator vessel with the inlet to said high pressure compressor, a low pressure compressor having an inlet and an outlet, a fourth conduit communicating said space of said second separator vessel with the inlet of said low pressure compressor, a fifth conduit communicating the outlet of said low pressure compressor with the inlet of said high pressure compressor, means to regulate the high pressure compressor speed in direct proportion to fluid pressure in said third conduit, a sixth conduit communicating the outlet of said high pressure compressor with the gas inlet to said oil well, a gas intermittor in said sixth conduit, a fluid flow control device in said first and second conduits, said fluid flow control device including a 3-way motor valve in said first and second conduits, a seventh conduit communicating the motor of said motor valve with said oil outlet whereby said valve directs flow of oil and gas from said well to said first separator and to said second separator in response to pressure in said oil outlet and separate means for outlet of liquids from said first and second separator vessels.

4. In an intermitting cycle gas-lift system for producing oil from an oil well having an oil outlet and a gas inlet, the improvement comprising, in combination, a first separator vessel having an upper normally gas containing space, a first conduit communicating said first separator vessel with the oil outlet of said oil well, a second separator vessel having an upper normally gas containing space, a second conduit communicating said second separator vessel with the oil outlet of said oil well, a high pressure compressor having an inlet and an outlet, a third conduit communicating said space of said first separator vessel with the inlet to said high pressure compressor, a low pressure compressor having an inlet and an outlet, a fourth conduit communicating said space of said second separator vessel with the inlet of said low pressure compressor, a fifth conduit communicating the outlet of said low pressure compressor with the inlet of said high pressure compressor, means to regulate the low pressure compressor speed in direct proportion to fluid pressure in said fourth conduit, a sixth conduit communicating the outlet of said high pressure compressor with the gas inlet to said oil well, a gas intermittor in said sixth conduit, a fluid flow control device in said first and second conduits, said fluid flow control device including a 3-way motor valve in said first and second conduits, a seventh conduit communicating the motor of said motor valve with said oil outlet whereby said valve directs flow of oil and gas from said well to said first separator and to said second separator in response to pressure in said oil outlet and separate means for outlet of liquids from said first and second separator vessels.

5. In an intermitting cycle gas-lift system for producing oil from an oil well having an oil outlet and a gas inlet, the improvement comprising, in combination, a first separator vessel having an upper normally gas containing space, a first conduit communicating said first separator vessel with the oil outlet of said oil well, a second separator vessel having an upper normally gas containing space, a second conduit communicating said second separator vessel with the oil outlet of said oil well, a high pressure compressor having an inlet and an outlet, a third conduit communicating said space of said first separator vessel with the inlet to said high pressure compressor, a low pressure compressor having an inlet and an outlet, a fourth conduit communicating said space of said second separator vessel with the inlet of said low pressure compressor, a fifth conduit communicating the outlet of said low pressure compressor with the inlet of said high pressure compressor, means to regulate clearance on a high pressure compressor cylinder of said high pressure compressor to provide a substantially constant load on said high pressure compressor cylinder, a sixth conduit connecting said means with the high pressure compressor inlet, a seventh conduit communicating the outlet of said high pressure compressor with the gas inlet to said oil well, a gas intermittor in said seventh conduit, a fluid flow control device in said first and second conduits, said fluid flow control device including a 3-way motor valve in said first and second conduits, an eighth conduit communicating the motor of said motor valve with said oil outlet whereby said valve directs flow of oil and gas from said well to said first separator and to said second separator in response to pressure in said oil outlet and separate means for outlet of liquids from said first and second separator vessels.

6. In an intermitting cycle gas-lift system for producing oil from an oil well having an oil outlet and a gas inlet, the improvement comprising, in combination, a first separator vessel having an upper normally gas containing space, a first conduit communicating said first separator vessel with the oil outlet of said oil well, a second separator vessel having an upper normally gas containing space, a second conduit communicating said second separator vessel with the oil outlet of said oil well, a high pressure compressor having an inlet and an outlet, a third conduit communicating said space of said first separator vessel with the inlet to said high pressure compressor, a low pressure compressor having an inlet and an outlet, a fourth conduit communicating said space of said second separator vessel with the inlet of said low pressure compressor, a fifth conduit communicating the outlet of said low pressure compressor with the inlet of said high pressure compressor, means to regulate clearance on the low pressure compressor to eliminate overloading of said low pressure compressor a sixth conduit connecting said means with said fifth conduit, a seventh conduit communicating the outlet of said high pressure compressor with the gas inlet to said oil well, a gas intermittor in said seventh conduit, a fluid flow control device in said first and second conduits, said fluid flow control device including a 3-way motor valve in said first and second conduits, an eighth conduit communicating the motor of said motor valve with said oil outlet whereby said valve directs flow of oil and gas from said well to said first separator and to said second separator in response to pressure in said oil outlet and separate means for outlet of liquids from said first and second separator vessels.

7. An apparatus for separating low pressure fluid from high pressure fluid comprising, in combination, a valve body having a first conduit therethrough, a side outlet in said valve body communicating with said conduit, a first valve seat around the inner wall of said side outlet, a second valve seat surrounding a portion of said first conduit, a two-way valve head intermediate said first and second valve seats whereby said valve head upon upward movement thereof seats against said second valve seat with said first valve seat being open and upon downward movement thereof seats, against said first valve seat with said second valve seat being open, a second conduit connected with said first conduit on the valve head side of said second valve seat, a motor supporting and actuating said valve head, an orifice plate in said second conduit upstream of said side outlet as regards direction of flow of fluid through said conduits, and first means communicating said second conduit on either side of said orifice plate with said motor whereby said motor actuates said valve head.

8. The apparatus of claim 7 wherein said motor is a pneumatically operable motor, said first means comprises a first differential on-off pressure controller and a second means comprising a second static on-off pressure controller communicating said second conduit on the side of said orifice plate adjacent said valve and said differential controller with said motor whereby said motor actuates said valve head in opposition to the actuation of said valve head by said first means.

References Cited in the file of this patent

UNITED STATES PATENTS

| | | |
|---|---|---|
| 1,410,228 | Stuck | Mar. 21, 1922 |
| 1,798,774 | Yates | Mar. 31, 1931 |